(12) United States Patent
Zhang et al.

(10) Patent No.: US 11,264,882 B2
(45) Date of Patent: Mar. 1, 2022

(54) VIBRATING MOTOR

(71) Applicant: AAC Acoustic Technologies (Shenzhen) Co., Ltd., Shenzhen (CN)

(72) Inventors: Tao Zhang, Shenzhen (CN); Zhiyong Cui, Shenzhen (CN)

(73) Assignee: AAC Acoustic Technologies (Shenzhen) Co., Ltd., Shenzhen (CN)

(*) Notice: Subject to any disclaimer, the term of this patent is extended or adjusted under 35 U.S.C. 154(b) by 199 days.

(21) Appl. No.: 16/699,149

(22) Filed: Nov. 29, 2019

(65) Prior Publication Data

US 2020/0195116 A1 Jun. 18, 2020

(30) Foreign Application Priority Data

Dec. 17, 2018 (CN) .......................... 201822119086.6

(51) Int. Cl.
 *H02K 33/18* (2006.01)
(52) U.S. Cl.
 CPC .................................. *H02K 33/18* (2013.01)
(58) Field of Classification Search
 CPC .......... H02K 1/34; H02K 35/02; H02K 35/04; H02K 33/12; H02K 35/00; H02K 33/18; H02K 33/00; H02K 33/02; H02K 33/14; H02K 33/16
 USPC ..................................................... 310/28, 35
 See application file for complete search history.

(56) References Cited

U.S. PATENT DOCUMENTS

| 2002/0149282 A1* | 10/2002 | Heidrich | ................ H02K 1/148 310/216.064 |
| 2011/0037335 A1* | 2/2011 | Jang | ...................... H02K 1/148 310/156.32 |

FOREIGN PATENT DOCUMENTS

CN 206524745 U * 9/2017

OTHER PUBLICATIONS

Chen (CN 206524745 U) English Translation (Year: 2017).*

* cited by examiner

*Primary Examiner* — Tulsidas C Patel
*Assistant Examiner* — Robert E Mates
(74) *Attorney, Agent, or Firm* — W&G Law Group

(57) ABSTRACT

The present application discloses a vibrating motor, which includes a housing having a receiving cavity, a stator received in the receiving cavity, a vibrator received in the receiving cavity, and a flexible assembly received in the receiving cavity. The flexible assembly is configured for elastically supporting the vibrator. The housing includes a top wall, a bottom wall facing the top wall, and a side wall connecting the top wall and the bottom wall. The stator includes an iron core, a coil sleeved on the iron core, and pole shoes positioned at two ends of the iron core. Each the pole shoe has a surface close to the iron core recessed to form an avoiding portion, and the iron core is inserted in the avoiding portion.

9 Claims, 4 Drawing Sheets

A–A

VIBRATING MOTOR

FIELD OF THE PRESENT DISCLOSURE

The present disclosure relates to the field of vibrating motors, and more particularly to a vibrating motor applied to mobile communication devices.

DESCRIPTION OF RELATED ART

With the development of electronic technology, portable consumer electronics are increasingly popular to customers, such as mobile phones, handheld game players, navigation devices, and handheld multimedia entertainment devices, etc. Vibrating motors are generally applied to the consumer electronics to give system feedbacks, for instance, to give feedbacks for incoming calls and messages of mobile phones, navigation prompts of navigation devices, or prompts of game players. The vibrating motors are such widely used so that high performance and long service life are needed for the vibrating motors.

In related art, a vibrating motor commonly includes a housing having a receiving cavity, a vibrator received in the receiving cavity, a stator received in the receiving cavity, and a flexible assembly received in the receiving cavity. The flexible assembly connects the housing and the vibrator. The vibrator is supported by the flexible assembly and reciprocates in the housing along horizontal direction to generate vibration. The current stator commonly includes an iron core, a coil sleeved on the iron core, and pole shoes welded or adhered to two ends of the iron core. Such a stator occupies a large space. Further, the welding process of welding the pole shoes to the iron core carried out inside the stator is complicated, especially in case the pole shoes are thick, it takes a greater welding energy or the pole shoes cannot be welded to the iron core at all, which results a weak bonding strength between the pole shoes and the iron core, making the welding process an un-effective process.

Therefore, it is desirable to provide a new vibrating motor to overcome the above-mentioned problems.

BRIEF DESCRIPTION OF THE DRAWINGS

To clearly illustrate the technical solutions that are reflected in various embodiments according to this disclosure, the accompanying drawings intended for the description of the embodiments herein will now be briefly described. It is evident that the accompanying drawings listed in the following description show merely some embodiments according to this disclosure, and that those having ordinary skill in the art will be able to obtain other drawings based on the arrangements shown in these drawings without making inventive efforts.

DETAILED DESCRIPTION OF THE EXEMPLARY EMBODIMENTS

The technical solutions of the embodiments of the present disclosure will be clearly and completely described in the following with reference to the accompanying drawings. It is obvious that the embodiments to be described are only a part rather than all of the embodiments of the present disclosure. All other embodiments obtained by persons skilled in the art based on the embodiments of the present disclosure without creative efforts shall fall within the protection scope of the present disclosure.

Embodiment One

Figure 1:
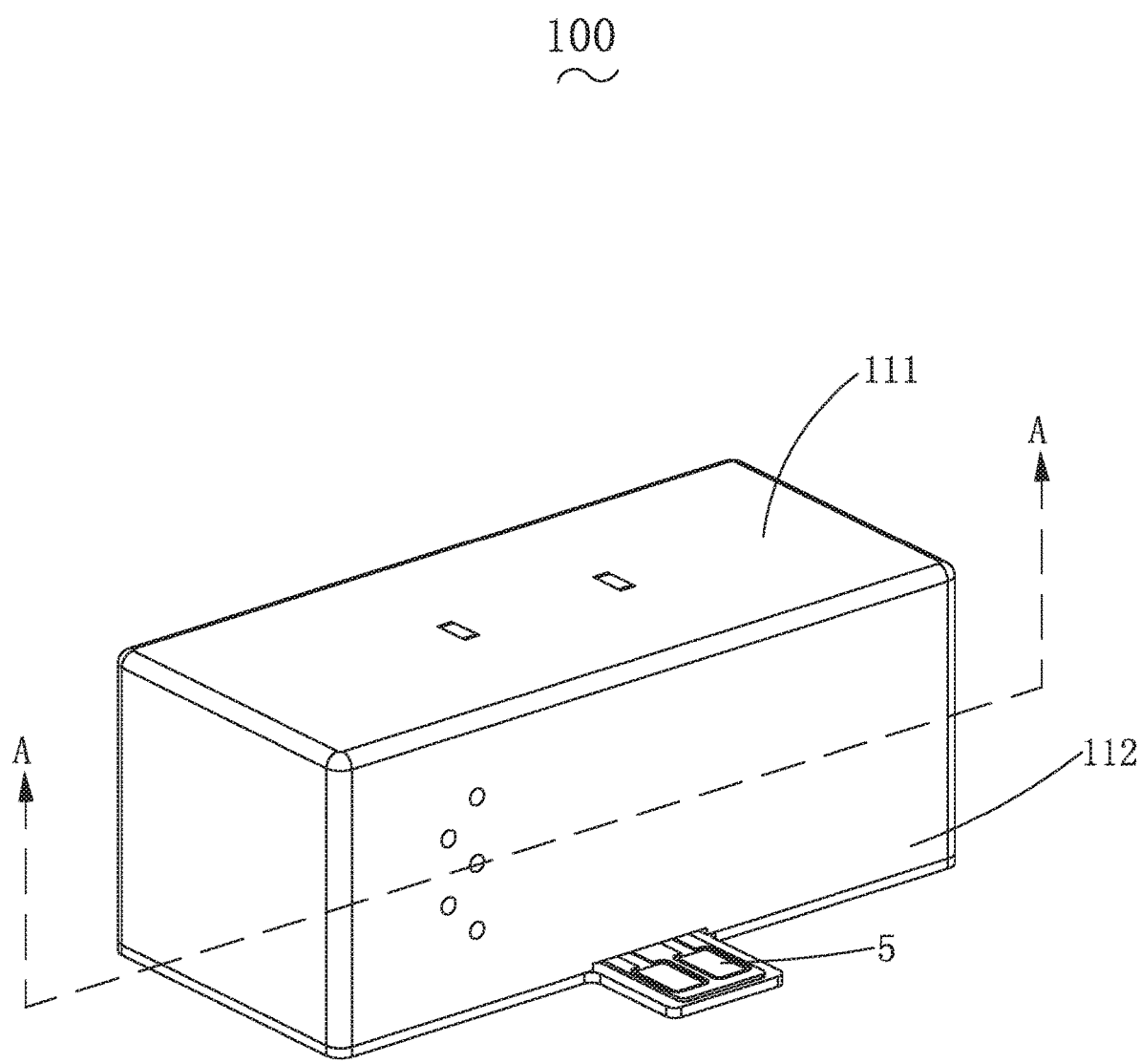
FIG. 1 is a perspective view of a vibrating motor in accordance with an embodiment of the present disclosure.
Figure 2:
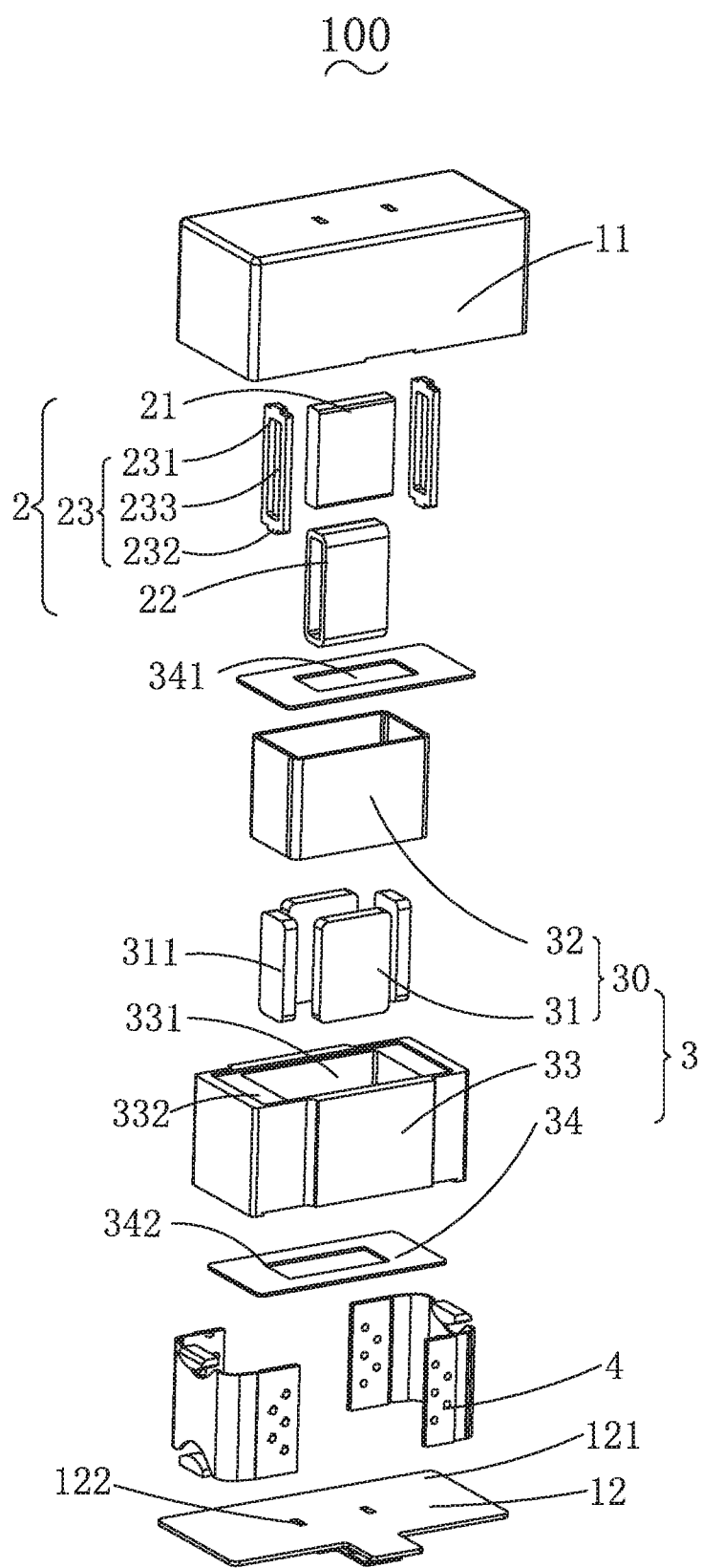
FIG. 2 is an exploded view of the vibrating motor in accordance with a first embodiment of the present disclosure.
Figure 3:
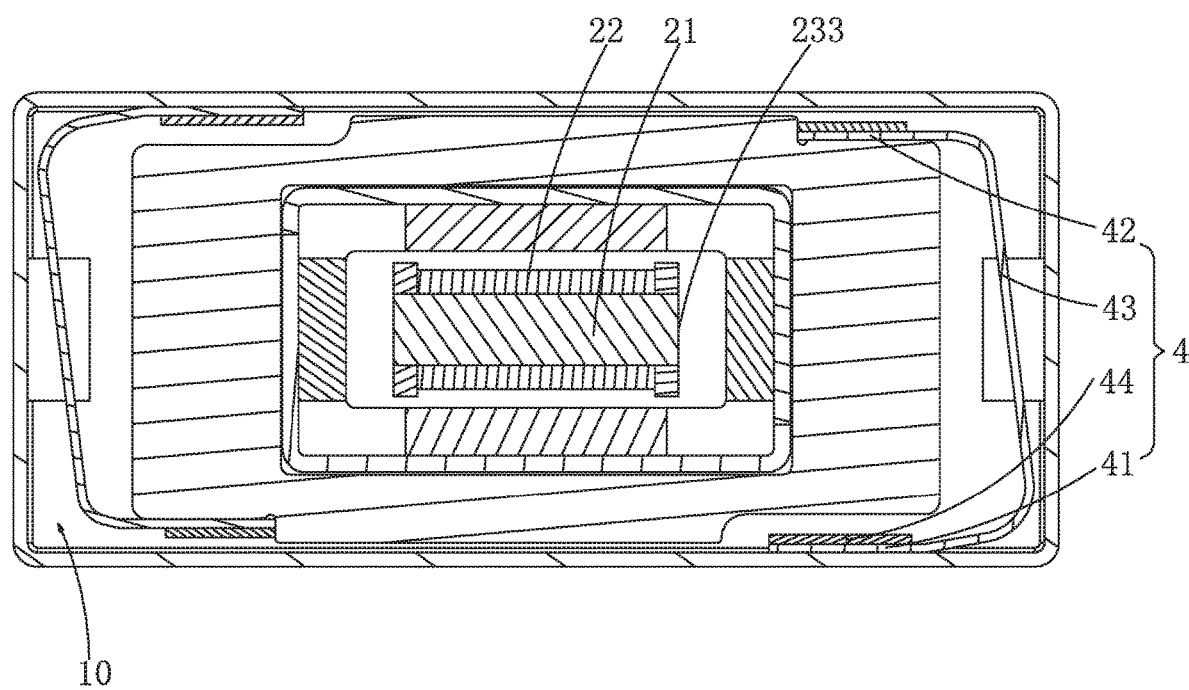
FIG. 3 is a cross-sectional view of the vibrating motor in FIG. 1 taken along line A-A.

Referring to FIGS. 1 to 3, a vibrating motor 100 is provided. The vibrating motor 100 includes a housing 1, a stator 2, a vibrator 3, and a flexible assembly 4 for supporting the vibrator 3. The stator 2, vibrator 3, and flexible assembly 4 are all received in the housing 1.

The housing 1 includes an upper housing 11 and a lower housing 12 cooperatively forming a receiving cavity 10 with the upper housing 11. In the embodiment, the upper housing 11 includes a top wall 111 and a side wall 112 extending bently from the top wall 111. The lower housing 12 includes a bottom wall 121 corresponding to the top wall 111. The vibrating motor 100 also defines with a fixing hole 122 which is recessed along a direction from the bottom wall 121 toward the top wall 111, or a direction from the top wall 111 toward the bottom wall 121. In other embodiments, the vibrating motor 100 may define with fixing holes 122 with some recessed along a direction from the bottom wall 121 toward the top wall 111 and the other recessed along a direction from the top wall 111 toward the bottom wall 121. The fixing hole 122 is configured for fixing the stator 2. The stator 2 is fixed to the housing 1, one end of the flexible assembly 4 connects the vibrator 3, and another end of the flexible assembly 4 connects the side wall 112 of the housing 1.

The stator 2 includes an iron core 21, a coil 22 sleeved on the iron core 21, and two pole shoes 23 positioned at two ends of the iron core 21. Each the pole shoe 23 includes a main portion 231 and a positioning post 232 protruded from the main portion 231 towards the bottom wall 121 or the top wall 111. The fixing hole 122 is defined in the bottom wall 121 or the top wall 111 to match with the positioning post 232. The positioning post 232 is inserted into the fixing hole 122 to fix the pole shoes 23 to the housing 1, thereby fixing the stator 2 to the housing 1. In other embodiment, the stator 2 includes positioning posts 232 protruded from the main portion towards the bottom wall 121 and the top wall 111 respectively, and the bottom wall 121 and the top wall 111 are respectively defined with the fixing hole 122 to match with the positioning posts 232. The main portion 231 of the pole shoe 23 has a surface near the iron core 21 recessed to form an avoiding portion 233, and the iron core 21 is inserted into the avoiding portion 233, thereby achieving the fixing between the iron core 21 and the pole shoe 23. In such a configuration with the iron core 21 being inserted into the avoiding portion 233, the space occupied by the stator 2 is saved, and the welding process of welding the iron core 21 and the pole shoe 23 is simplified benefit from the reduced thickness of the welded region at the avoiding portion 233, thereby greatly improving the stability of the vibrating motor.

In some embodiments, the avoiding portion 233 penetrates through the pole shoe 23. In such a configuration, the welding can be directly performed outside the stator 2, and the efficiency and product yield may be improved.

In some embodiments, the coil 22 contacts the inner surface of the pole shoes 23.

In the exemplary embodiment, the iron core 21 is a rectangular solid, and the coil 22 is annular with its inner surface attaching the outer surface of the iron core 21.

The vibrator 3 includes a magnetic body 30 located at two ends and/or two sides of the stator 2. The magnetic body 30 defines a receiving space, and the stator 2 is received in the receiving space and spaced from the magnetic body 30. The magnetic body 30 includes a magnetic steel 31 and a pole core 32 located at a side of the magnetic steel 31 away from the stator 2, and the pole core 32 has a shape like a unitary ring or a rectangular. A distance between the stator 2 and the magnetic steel 31 is no less than the maximum amplitude of the vibrator 3.

In the exemplary embodiment, the magnetic steel 31 includes four sub-magnetic steels 311 which are distributed at two ends and two sides of the stator 2. The magnetic body 30 includes two pole cores 32 which cooperatively form an accommodating cavity by connecting end to end, and the magnetic steel 31 and the stator 2 are accommodated in the accommodating cavity sequentially.

The vibrator 3 may further include a weight 33. The weight 33 includes an upper surface corresponding to the top wall 111, a lower surface corresponding to the bottom wall 121, and a rectangular through hole 331 extending through the upper surface and the lower surface. The magnetic body 30 is positioned in the through hole 331, and the outer surface of the pole core 32 attaches the inner surface of the through hole 331.

In some embodiments, the weight 33 further defines a recessed portion 332 recessed from the upper surface and/or the lower surface of the weight 33, the vibrator 3 further includes a hollowed plate 34 received in the recessed portion 332, the magnetic body 30 abuts against the hollowed plate 34, the inner edge of the hollowed plate 34 surrounds the stator 2, and the distance between the stator 2 and the inner edge of the hollowed plate 34 is no less than the maximum amplitude of the vibrator 3 to prevent the stator 2 from being affected during the vibrator 3 vibrating.

Referring to FIG. 2, in the embodiment, the hollowed plate 34 includes an upper hollowed plate 341 and a lower hollowed plate 342, the pole shoes 23 pass through the upper hollowed plate 341 and the lower hollowed plate 342 to be fixed to the housing 1, allowing the coil 22 to electrically connect outside.

The flexible assembly 4 is a leaf spring, with one end connecting the side wall 112 of the housing 1 and the other end connecting the vibrator 3, to elastically support the vibrator 3. The flexible assembly 4 includes a first elastic portion 41 connected to the side wall 112 of the housing 1, a second elastic portion 42 connected to the vibrator 3, and a connecting portion 43 connecting the first elastic portion 41 and the second elastic portion 42. A reinforcing member 44 may be provided to enhance the bonding force of the flexible assembly 4 and prevent the flexible assembly 4 from being broken in case of excessively bending. The reinforcing member 44 may be fixed to the joint of the flexible assembly 4 and the side wall 112 of the housing 1, and/or the joint of the flexible assembly 4 and the vibrator 3. In the exemplary embodiment, the flexible assembly 4 has a "U" like shape.

The lower housing 12 is provided with a printed circuit board (PCB) 5 to realize an electrical connection between the vibrating motor 100 and the outside.

Embodiment Two

Figure 4:
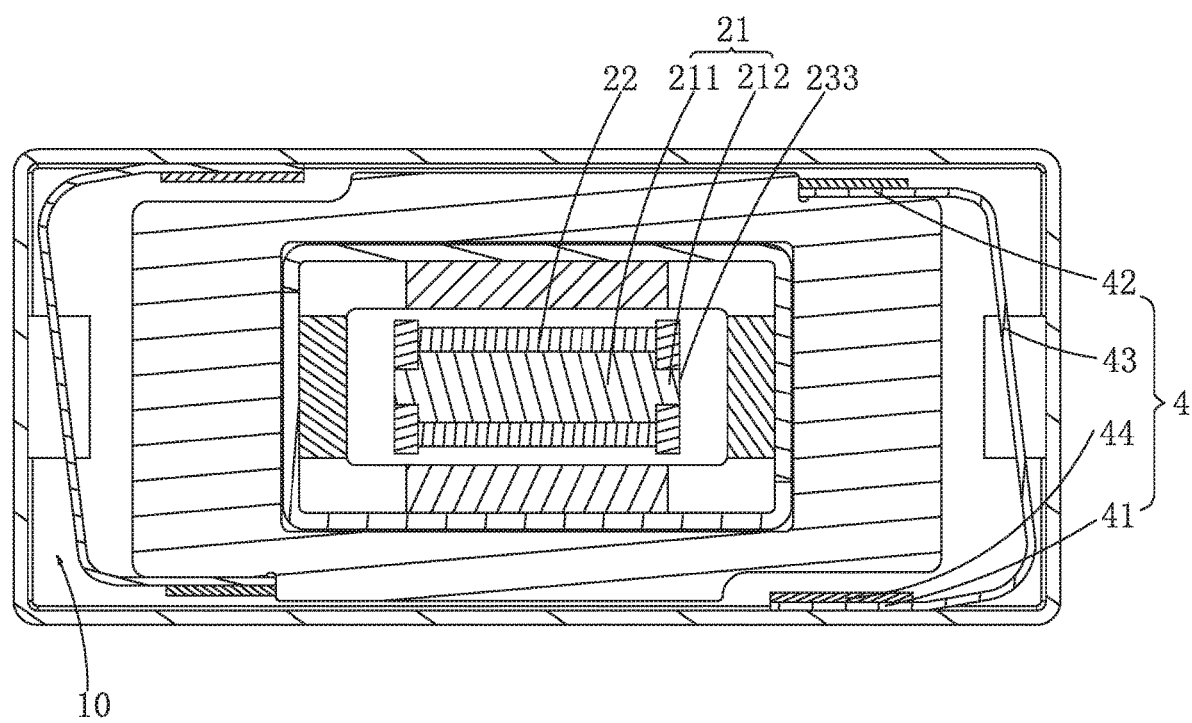
FIG. 4 is a cross-sectional view of the vibrating motor in accordance with a second embodiment of the present disclosure.

Please referring to FIG. 4, it is an improvement to the iron core 21 of the stator 2 in the Embodiment One. The iron core 21 here includes a central portion 211 and two protruding portions 212 protruded from the central portion 211 and towards the pole shoe 23, and each the protruding portion 212 is inserted into a corresponding avoiding portion 233.

Preferably, the central portion 211 abuts against the pole shoes 23.

In such a configuration by defining the protruding portion 212 and making the central portion 211 abutting against the pole shoe 23, the position at which the iron core 21 is inserted into the pole shoe 23 can be adjusted as needed, and the reliability of the positioning of the iron core 21 can be improved.

The vibrating motor of the present disclosure includes a housing having a receiving cavity, a stator, a vibrator, and a flexible assembly for elastically supporting the vibrator; the stator, the vibrator, and the flexible assembly are all received in the receiving cavity of the housing. The stator includes an iron core, a coil sleeved on the iron core, and two pole shoes positioned at two ends of the iron core. The vibrator includes magnetic steels which surround the coil, the pole shoe defines with avoiding portion, and the iron core is inserted in the avoiding portion, as such the space occupied by the stator is saved, and the welding process of welding the iron core and the pole shoes is simplified and energy saved both benefit from the reduced thickness of the welded region at the avoiding portion 233, thereby greatly improving the stability of the vibrating motor. In addition, the avoiding portion can be arranged to extend through the pole shoe, making the welding can be directly performed outside the stator, thus can improve efficiency and product yield.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the disclosure to the full extent indicated by the broad general meaning of the terms where the appended claims are expressed.

What is claimed is:
1. A vibrating motor, comprising:
a housing having a receiving cavity;
a stator received in the receiving cavity;
a vibrator received in the receiving cavity; and
a flexible assembly received in the receiving cavity; the flexible assembly being configured for elastically supporting the vibrator;
the housing comprising:
a top wall;
a bottom wall facing the top wall; and
a side wall connecting the top wall and the bottom wall;
the stator comprising:
an iron core;
a coil sleeved on the iron core; and
a pole shoe positioned at each end of the iron core;
wherein each pole shoe has a surface close to the iron core recessed to form an avoiding portion, and the iron core is inserted into the avoiding portion;
wherein the vibrator further comprises a weight,
the weight comprises an upper surface and a lower surface,
the weight defines a recessed portion recessed from the upper surface and/or the lower surface of the weight, the vibrator further comprises a hollowed plate received in the recessed portion, an inner edge of the hollowed plate sur- rounds the stator, and a distance between the stator and the inner edge of the hollowed plate is no less than a maximum amplitude of the vibrator.

2. The vibrating motor according to claim 1, wherein the avoiding portion penetrates through the pole shoe.

3. The vibrating motor according to claim 1, wherein the coil abuts against an inner surface of the pole shoe.

4. The vibrating motor according to claim 1, wherein the iron core comprises a central portion and a protruding portion protruded from the central portion and towards one of the pole shoes, and the protruding portion is inserted in the avoiding portion.

5. The vibrating motor according to claim 4, wherein the central portion abuts against the one of the pole shoes.

6. The vibrating motor according to claim 1, wherein each pole shoe comprises a main portion and a positioning post protruded from the main portion towards the bottom wall or the top wall, and the bottom wall or the top wall is defined with a fixing hole matching with the positioning post; or each pole shoe comprises a main portion and positioning posts protruded from the main portion towards the bottom wall and the top wall respectively, and the bottom wall and the top wall are respectively defined with fixing holes matching with the positioning posts.

7. The vibrating motor according to claim 1, wherein the vibrator comprises a magnetic body located at two ends and/or two sides of the stator, the magnetic body defines a receiving space, and the stator is received in the receiving space and spaced from the magnetic body; the magnetic body comprises a magnetic steel and a pole core located at a side of the magnetic steel away from the stator.

8. The vibrating motor according to claim 7, wherein the weight comprises a through hole extending through the upper surface and the lower surface, the upper surface is corresponding to the top wall, the lower surface is corresponding to the bottom wall; the magnetic body is positioned in the through hole, and the pole core attaches to an inner surface of the through hole.

9. The vibrating motor according to claim 8, wherein the magnetic body abuts against the hollowed plate.

* * * * *